J. W. ACHARD.
TERMINAL FOR SECONDARY OR STORAGE BATTERIES.
APPLICATION FILED JULY 19, 1912.
1,085,959.
Patented Feb. 3, 1914.
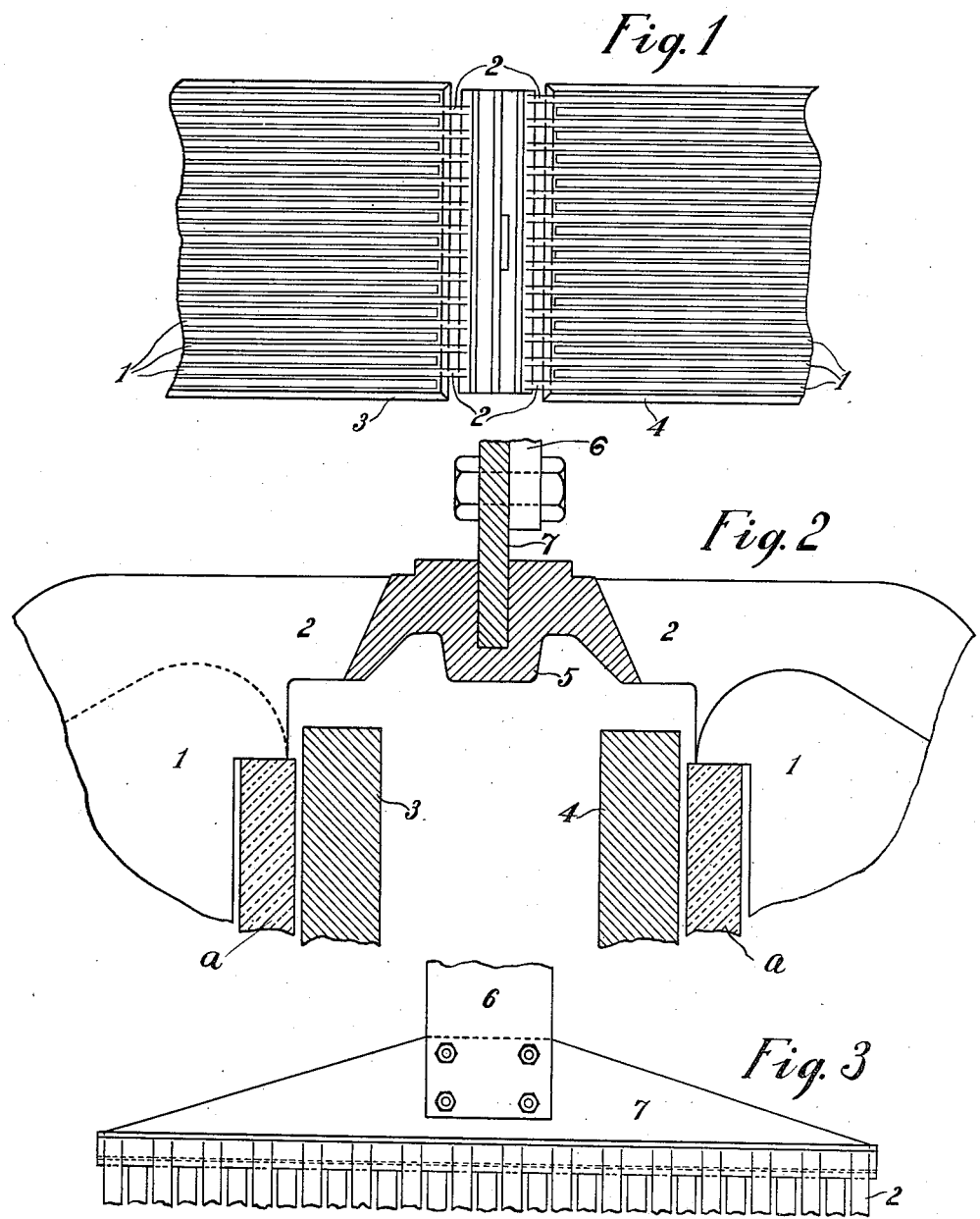
INVENTOR
John W. Achard

UNITED STATES PATENT OFFICE.

JOHN W. ACHARD, OF PHILADELPHIA, PENNSYLVANIA.

TERMINAL FOR SECONDARY OR STORAGE BATTERIES.

1,085,959.  Specification of Letters Patent.  Patented Feb. 3, 1914.

Application filed July 19, 1912. Serial No. 710,333.

*To all whom it may concern:*

Be it known that I, JOHN W. ACHARD, a citizen of the United States, residing at the city of Philadelphia, in the county of Philadelphia and State of Pennsylvania, have invented a new and useful Terminal for Secondary or Storage Batteries, of which the following is a specification.

The principal object of the present invention is to provide a simple, inexpensive and effective terminal or bus for secondary or storage batteries; to avoid joints and their consequent drop and heating; to effect a saving of material and of labor in both construction and installation; and to uniformly distribute current among all of the plates of the group connected to the terminal or bus.

The invention will be claimed at the end hereof but the embodiment of it chosen among other embodiments for description and illustration in the accompanying drawings will be first described.

In those drawings Figure 1, is a top or plan view illustrating a terminal connection embodying features of the invention. Fig. 2, is an elevational view, partly in section, drawn to an enlarged scale of the same, and Fig. 3, is a side elevational view of the same.

In the drawings 1, is a plurality of plates having lugs 2.

*a* are insulating supports for the plates. As shown the plates are arranged in two tanks 3 and 4, but the invention is not confined to that construction since it can be applied to a group of plates whether arranged in one, two or more jars or tanks.

5, is a metallic bar common to the lugs in the sense that it is electrically connected with them. This bar may consist of lead or lead alloy and it may be referred to as a leaden bar.

6, is a conductor taking current from the cell or cells.

7, is a distributing integral plate of higher specific conductivity than the bar 5, and it is connected with the conductor 6, and is partially embedded in the metal of the bar 5. This integral plate 7, may consist of copper and it is embedded edgewise in the bar 5. Furthermore this plate 7, is shown as of the general form of a triangle with its apex cut off or it might be said to be of generally triangular form.

The described construction is evidently comparatively free from joints and the plate 7, not only adds strength but also uniformly distributes current among all the plates.

Obviously modifications may be made in details of construction and arrangement shown in the drawings and above referred to without departing from the spirit of the invention, but

Having thus described the nature and objects of my invention, what I claim as new and desire to secure by Letters Patent is:

1. A terminal for secondary or storage batteries comprising the combination of a bar adapted for connection to a group of plates, and a plate of higher specific conductivity than the bar and partly embedded edgewise in the bar and said plate having generally triangular form to provide at its apex a terminal connection, substantially as described.

2. A terminal for secondary or storage batteries comprising the combination of a leaden bar adapted for connection to a group of electrodes, and a plate of higher specific conductivity than the bar and having one of its edges continuously embedded in the bar and extending substantially throughout the length of the bar to lead off current from all points of the bar and the plate projecting above the bar to constitute a terminal connection.

In testimony whereof I have hereunto signed my name.

JOHN W. ACHARD.

Witnesses:
J. H. TRACY,
FIRTH LEE.